Oct. 2, 1945.   F. W. JOBE   2,385,992
VISUAL ACUITY TESTING MEANS
Filed May 27, 1944
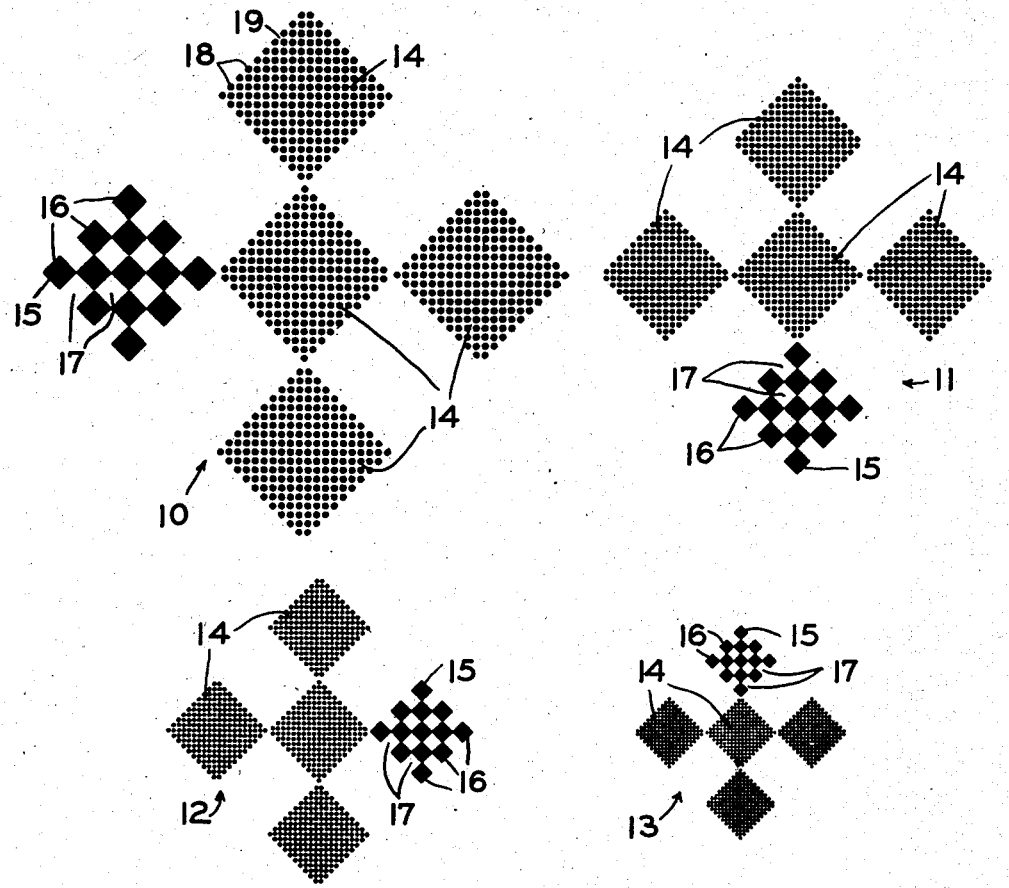
FREDERICK W. JOBE
INVENTOR
ATTORNEY Patented Oct. 2, 1945

2,385,992

UNITED STATES PATENT OFFICE 2,385,992

VISUAL ACUITY TESTING MEANS

Frederick W. Jobe, Brighton, N. Y., assignor to Bausch & Lomb Optical Company, Rochester, N. Y., a corporation of New York Application May 27, 1944, Serial No. 537,577

8 Claims. (Cl. 88—20)

This invention relates to ophthalmic equipment and more particularly it has reference to devices for testing or determining visual acuity in either commonplace or instrumental vision.

The Snellen chart, carrying a series of letters graded according to size, is widely used for testing visual acuity. Such charts, however, do not provide accurate tests of the resolving power of the eye since the subject may recognize the letters by other visual functions such as shape perception and visibility.

Another type of acuity testing chart makes use of a graded series of broken rings with the gap in the ring subtending a known angle at a known distance. Objection has also been raised to this type of test object because a person having a very good light sense will be able to see the gap or at any rate notice an increased illumination at its situation in a broken ring and thereby be rated as having a higher visual acuity than he really has.

It is an object of the present invention to provide means for testing visual acuity independently of visual functions such as shape perception and visibility. Another object is to provide improved means for accurately determining the resolving power of the eye. These and other objects and advantages reside in certain novel features of construction, arrangement, and combination of parts as will hereinafter be more fully described and pointed out in the appended claims.

The figure of the drawing shows a plurality of graded targets embodying my invention.

One embodiment of my invention is illustrated in the drawing wherein there are shown a plurality of spaced targets 10, 11, 12, and 13 which are graded with respect to size and reproduced on a chart or the like. Each target has the same form outline, namely a square, and is oriented with the diagonal of the square in a vertical position. Each target is divided into nine equal squares and the central and corner squares have an appearance which contrasts with the remaining clear or white squares so that the target presents a mosaic pattern. Each target has four identical non-critical squares or areas 14 which serve as "confusion" areas and a fifth critical square or area 15 which serves as means for testing the resolving power or visual acuity of the eye under examination.

The critical area 15 of each target is made up of thirteen black squares 16 and twelve equal white squares 17 arranged in a checkerboard pattern. Each of these squares constitutes a critical detail of the target which serves as a test for the resolving power of the eye. If the subject can just detect a lack of homogeneity in the critical area 15 when its critical test details, the black and white squares, each subtend a visual angle of one minute at the eye, his visual acuity is considered to be normal. When this liminal performance is made at a standard distance of twenty feet from the test target, the subject is said to have a visual acuity rating of 20/20. The targets 10, 11, 12, and 13, reproduced on a chart, are graded with respect to size so that the critical test details of the targets will subtend a visual angle of one minute at respectively different standard distances from the chart.

The critical areas 15 are oriented indiscriminately in the corners of the respective targets on a chart and a detectable lack of homogeneity in the critical area is presumed to indicate visual resolution of its critical details. The criterion of homogeneity, by means of which the subject identifies the critical area 15, is the appearance to the subject of the non-critical areas 14. These non-critical areas 14, or areas of confusion, are designed to have substantially the same subjective tone (grade of grayness; brightness) as that of the critical area 15 when the latter is seen under such conditions of size, distance, and illumination that it is rendered apparently homogeneous through non-resolution of its critical details. In other words, when the critical details of the critical area 15 of a given target cannot be resolved by the eye under test, the critical and non-critical areas of the target are visually indistinguishable.

In the targets illustrated on the drawing, the desired subjective tone of the non-critical or confusion areas 14 is created by making use of the homogenization of a mosaic through non-resolution of its units. Each confusion or non-critical area 14 bears an imbricated pattern of non-contiguous, equally spaced, circular black spots 18 upon a continuous white background 19. In each non-critical area or square 14, the total area of the black spots to the total area of white background bears the ratio of 13:12. The black spots 18 are large enough to be reproducible by zinc etching or other suitable processes. The black spots 18 on the non-critical area 14 are so much smaller than the critical details 16 and 17 of the critical area 15 that the black spots and their white background blend into visual homogeneity at a distance, or size or brightness of target which readily permits resolution of the critical details in the critical area 15.

When the subject is unable to resolve the critical details in a given target, the critical area 15 in that target becomes visually indistinguishable from the confusion or non-critical areas 14 in that target since it is equally homogeneous and of the same grayness or brightness. When, however, the subject can resolve the pattern of the critical area 15 in a given target, that area presents to him an appearance which is different, in a manner which the subject need not be capable of describing, from that of the confusion or non-critical areas 14 in the same target. The subject reports the location of the critical or different-looking area 15 as being at the right, left, top or bottom portion of the target. Since the critical and non-critical areas of a target are visually indistinguishable except when the critical details of the critical area 15 are resolvable, this target affords an accurate means for determining visual acuity. With this test, the determination of the resolving power of the eye of the subject is not influenced by the subject's ability to recognize the critical test details by visual functions such as shape perception and visibility. The targets used on my chart are, of course, graded in size in a known manner so that the ability of the subject to just resolve one of the targets may be translated into units indicating visual acuity or resolving power.

Various modifications may, obviously, be made without departing from the spirit of my invention. It is to be understood, of course, that my targets may be reproduced on a chart or on transilluminated slides for observation. Or the targets may be reproduced on slides for projection onto a screen. The number of confusion areas on the target may be reduced or increased; there may be more than one critical area on a target; the gray tone of the confusion or non-critical areas may be created by hatching rather than by spots; the surround of the target may be altered or eliminated; the target may be circular with segmental critical and non-critical areas.

I claim:

1. A device for determining visual acuity comprising means providing a plurality of targets graded with respect to size, each target comprising at least one critical area and at least one non-critical area, said areas having substantially the same form and size, the critical area comprising spaced critical details for testing visual acuity, the critical and non-critical areas having substantially the same subjective tone whereby they are visually indistinguishable except when the critical details are resolvable.

2. In a device for testing visual acuity, a target comprising at least one critical area and at least one non-critical area, the critical area comprising spaced critical details of known size for testing visual acuity, the critical and non-critical areas having substantially the same size, form, and subjective tone whereby they are visually indistinguishable except when the critical details are resolvable.

3. A device for determining visual acuity comprising means providing a plurality of targets graded with respect to size, each target comprising at least one non-critical area and at least one critical area, said areas having substantially the same form and size, the critical area having separated details of a known size for testing visual acuity, the separation between the details being different for each target, the critical and non-critical areas of a given target having substantially the same subjective tone whereby they are visually homogeneous when the separated details of the critical area are not resolvable by the eye under test.

4. A device for determining visual acuity comprising means providing a plurality of targets graded with respect to size, each target comprising at least one critical area and at least one non-critical area, said areas having substantially the same form and size, the critical area having a mosaic of critical details formed with two contrasting constituents to serve as a test for visual acuity, the non-critical area having a mosaic also formed of two contrasting constituents, the ratio between the total area of one constituent to the total area of the other constituent being substantially the same for all of the areas in a given target whereby the critical and non-critical areas having substantially the same subjective tone and are visually indistinguishable except when the critical details of the test are resolvable.

5. A device for testing visual acuity comprising means providing a plurality of targets of graded sizes, each target having at least one critical area and at least one non-critical area, said areas having substantially the same form and size, the critical area comprising a mosaic of areas arranged on a contrasting background with spaces between the areas which can be resolved by the eye, the non-critical area comprising a pattern of areas on a contrasting background with spaces between the areas which are smaller than the spaces on the critical area and which are unresolvable when the eye is performing at the liminal resolving power, the critical and non-critical areas of each target having substantially the same subjective tone whereby they are visually indistinguishable except when the spaces of the critical area of that target are resolvable.

6. In a device for determining visual acuity, a target comprising at least one critical area and at least one non-critical area, said areas having substantially the same form and size, the critical area comprising a background with a superposed contrasting pattern of spaced critical portions of known size for testing visual acuity, the non-critical area comprising a background with a superposed pattern of spaced contrasting portions, the spacings between the contrasting portions of the non-critical area being less than the spacings between the contrasting portions of the critical area and being unresolvable when the eye is performing at its liminal resolving power, the ratio of the total area of the portions to the total area of exposed background being substantially the same for the critical and non-critical areas whereby the critical and non-critical areas have substantially the same subjective tone and are visually indistinguishable except when the critical portions are resolvable.

7. A device for determining visual acuity comprising means providing a plurality of targets graded with respect to size, each target comprising a mosaic formed of a plurality of non-critical areas and at least one critical area, the critical and non-critical areas of a given target having substantially the same form and size, each non-critical area comprising a mosaic of spaced black areas on a white background, each critical area comprising a mosaic of spaced black areas on a white background to provide critical details of a known size for visual acuity testing, the spacings between the black areas on the critical area being greater than the spacings between the black areas on the non-critical area, the average ratio between the total black area and the total area of exposed background being substantially the same for all critical and non-critical areas whereby the critical and non-critical areas of each target have the same subjective tone, the critical and non-critical areas being visually indistinguishable except when the critical details are resolvable.

8. A target for testing visual acuity comprising at least one critical area and at least one non-critical area, said areas having substantially the same form and size, the critical area comprising a pattern of areas arranged on a contrasting background with spaces between the areas which can be resolved by the eye, the non-critical area comprising a pattern of areas on a contrasting background with spaces between the areas which are smaller than the spaces on the critical area and which are unresolvable when the eye is performing at its liminal resolving power, the critical and non-critical areas having substantially the same subjective tone whereby they are visually indistinguishable except when the spaces of the critical area are resolvable.

FREDERICK W. JOBE.